United States Patent
Belter et al.

(10) Patent No.: US 10,890,197 B2
(45) Date of Patent: Jan. 12, 2021

(54) HYDRAULIC ACTUATOR WITH A FREQUENCY DEPENDENT RELATIVE PRESSURE RATIO

(71) Applicant: ClearMotion, Inc., Billerica, MA (US)

(72) Inventors: Joseph Thomas Belter, Somerville, MA (US); Graham A. Dowie, Jericho, VT (US); Marco Giovanardi, Melrose, MA (US); Brian Alexander Selden, Concord, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 16/484,967

(22) PCT Filed: Feb. 12, 2018

(86) PCT No.: PCT/US2018/017879
§ 371 (c)(1),
(2) Date: Aug. 9, 2019

(87) PCT Pub. No.: WO2018/148689
PCT Pub. Date: Aug. 16, 2018

(65) Prior Publication Data
US 2019/0360505 A1 Nov. 28, 2019

Related U.S. Application Data

(60) Provisional application No. 62/457,933, filed on Feb. 12, 2017.

(51) Int. Cl.
*F15B 11/08* (2006.01)
*B60G 17/04* (2006.01)

(52) U.S. Cl.
CPC .......... *F15B 11/08* (2013.01); *B60G 17/0416* (2013.01)

(58) Field of Classification Search
CPC ............... F15B 11/08; B60G 2202/416; B60G 2400/206; B60G 2500/22; B60G 17/0416;
(Continued)

(56) References Cited

U.S. PATENT DOCUMENTS

| 5,028,073 A | 7/1991 | Harms et al. |
| 5,149,131 A * | 9/1992 | Sugasawa .......... B60G 17/0162 280/5.512 |

(Continued)

FOREIGN PATENT DOCUMENTS

| DE | 199 20 109 A1 | 11/2000 |
| DE | 10 2004 056610 A1 | 6/2006 |

(Continued)

OTHER PUBLICATIONS

International Search Report and Written Opinion dated Apr. 27, 2018 in connection with International Application No. PCT/JP2018/017879.

*Primary Examiner* — Thomas E Lazo
(74) *Attorney, Agent, or Firm* — Wolf, Greenfield & Sacks, P.C.

(57) ABSTRACT

Disclosed herein are hydraulic actuators and methods for the operation of actuators having variable relative pressure ratios. Further disclosed are methods for designing and/or operating a hydraulic actuator such that the actuator exhibits a variable relative pressure ratio. In certain embodiments, the relative pressure ratio of the hydraulic actuator may be dependent on one or more characteristics (such as, for example, frequency or rate of change) of an oscillating input to the hydraulic actuator.

23 Claims, 10 Drawing Sheets

(58) Field of Classification Search
CPC ................ B60G 13/14; B60G 2400/91; B60G 2800/916
See application file for complete search history.

(56) References Cited

U.S. PATENT DOCUMENTS

| | | | | |
|---|---|---|---|---|
| 5,174,598 | A * | 12/1992 | Sato | B60G 17/018 180/41 |
| 5,215,327 | A * | 6/1993 | Gatter | B60G 11/32 267/225 |
| 5,329,767 | A | 7/1994 | Hewett | |
| 5,348,338 | A * | 9/1994 | Kuriki | B60G 17/0152 280/124.141 |
| 5,390,948 | A | 2/1995 | Kuriki et al. | |
| 5,682,980 | A | 11/1997 | Reybrouck | |
| 6,264,212 | B1 * | 7/2001 | Timoney | B60G 17/0162 280/124.106 |
| 6,519,939 | B1 | 2/2003 | Duff | |
| 7,051,526 | B2 | 5/2006 | Geiger | |
| 7,631,736 | B2 | 12/2009 | Thies et al. | |
| 8,448,432 | B2 | 5/2013 | Bresie | |
| 8,776,961 | B2 | 7/2014 | Mori et al. | |
| 8,991,840 | B2 * | 3/2015 | Zuleger | B60G 15/12 280/124.16 |
| 9,108,484 | B2 | 8/2015 | Reybrouck | |
| 2003/0075881 | A1 * | 4/2003 | Delorenzis | B60G 17/0432 280/5.5 |
| 2003/0077183 | A1 | 4/2003 | Franchet et al. | |
| 2007/0089924 | A1 | 4/2007 | de la Torre et al. | |
| 2007/0233279 | A1 | 10/2007 | Kazerooni et al. | |
| 2008/0190104 | A1 | 8/2008 | Bresie | |
| 2008/0257626 | A1 | 10/2008 | Carabelli et al. | |
| 2009/0260935 | A1 * | 10/2009 | Avadhany | B60G 13/14 188/297 |
| 2010/0072760 | A1 | 3/2010 | Anderson et al. | |
| 2010/0262308 | A1 | 10/2010 | Anderson et al. | |
| 2014/0260233 | A1 | 9/2014 | Giovanardi et al. | |
| 2014/0265168 | A1 | 9/2014 | Giovanardi et al. | |
| 2018/0154728 | A1 * | 6/2018 | Giovanardi | B60G 17/0165 |

FOREIGN PATENT DOCUMENTS

| | | | |
|---|---|---|---|
| DE | 10 2010 023 434 A1 | 12/2011 | |
| WO | WO 2011/066416 A1 | 6/2010 | |
| WO | WO 2011/159874 A2 | 12/2011 | |
| WO | WO 2014/145018 A2 | 9/2014 | |
| WO | WO 2016/118887 A1 | 7/2016 | |
| WO | WO-2016118887 A1 * | 7/2016 | ......... B60G 17/0165 |

* cited by examiner

HYDRAULIC ACTUATOR WITH A FREQUENCY DEPENDENT RELATIVE PRESSURE RATIO

CROSS REFERENCE OF RELATED APPLICATIONS

This application is a national stage filing under 35 U.S.C. 371 of International Patent Application Serial No. PCT/US2018/017879, filed Feb. 12, 2018, which claims the benefit of priority under 35 U.S.C. § 119(e) of U.S. Provisional Application No. 62/457,933, filed Feb. 12, 2017 the disclosures of each of which are incorporated herein by reference in their entirety.

BACKGROUND

During the last forty years, a number of automotive manufacturers have attempted to utilize hydraulic actuators in automobiles. However, hydraulic-based active suspension systems have yet to achieve widespread adoption and commercial success in the automotive field.

SUMMARY

Inventors have recognized that there is often a tradeoff between a force capability of a hydraulic actuator and a response time of the hydraulic actuator. This trade-off may hinder the use of hydraulic actuators in applications in which both high force capability and fast response times are desired. Various methods, systems, and apparatuses are described herein to at least partially overcome this disadvantage.

In one aspect, a hydraulic actuator is disclosed that comprises: a hydraulic cylinder that includes an extension chamber and a compression chamber; a hydraulic pump, with a first port and a second port, capable of generating, or configured to generate, a pressure differential between the compression chamber the extension chamber. In certain embodiments, the hydraulic actuator further includes a first gas charged accumulator; a second gas charged accumulator; a first fluid flow path fluidically connecting the first port to the first gas charged accumulator; a second fluid flow path fluidically connecting the first port to the extension chamber; a third fluid flow path fluidically connecting the second port to the second gas charged accumulator; and a fourth fluid flow path fluidically connecting the second port to the compression chamber. The hydraulic cylinder may also include a housing at least partially enclosing an internal volume containing a quantity of hydraulic fluid, a piston slidably received in the housing, thereby dividing the internal volume into a compression chamber and an extension chamber, and a piston rod attached to the piston. In certain embodiments at least a portion of the first flow path and a portion of the second flow path are the same and at least a portion of the third flow path and the fourth flow path are the same.

In certain embodiments, the hydraulic actuator exhibits a first relative compliance factor when exposed to a first oscillating input, and a second relative compliance factor when exposed to a second oscillating input, wherein: the frequency of the first oscillating input is less than the frequency of the second oscillating input, and the first relative compliance factor is greater than the second relative compliance factor. Alternatively or additionally, the hydraulic actuator may exhibit a first relative pressure factor in response to a first oscillating input, and a second relative pressure factor in response to a second oscillating input, and wherein: the frequency of the first oscillating input is below the frequency of the second oscillating input; and the first relative pressure factor is less than the second relative pressure factor. In various embodiments, the frequency of the first oscillating input may be between 0-3 Hz exclusive and the frequency of the second oscillating input may be between 5-20 Hz exclusive. First and second oscillating inputs in other frequency ranges including those that are larger or smaller than the ranges indicated above are contemplated as the disclosure is not so limited.

In certain embodiments a restriction element or hydraulic control device may be arranged along the first flow path. In certain embodiments, the restriction element is configured to vary an impedance or inertance of the first flow path, or a portion thereof, based at least in part on a frequency of an input (e.g., a frequency of an oscillating torque applied to the pump, a frequency of an oscillating force exerted on the piston rod) relative to the impedance or inertance of a second flow path. In various exemplary embodiments, this restriction element may be a shim stack, a passive restriction, an orifice, a variable orifice valve, or an actively controlled valve. In certain embodiments, the restriction element includes an actively controlled valve, and the hydraulic actuator further includes a controller configured to actuate (e.g., at least partially open or at least partially close) the actively controlled valve based at least in part on a frequency of an input.

In another aspect, a vehicle is disclosed having a suspension system that, in various embodiments, includes at least one, at least two, at least three, or at least four hydraulic actuators according to any of the embodiments disclosed herein. In certain embodiments, the vehicle may have a plurality of wheels, and each wheel of the vehicle may be associated with a respective hydraulic actuator. In certain embodiments, the vehicle may include at least one hydraulic actuator, or a portion thereof, that is disposed between an unsprung mass of the vehicle and a sprung mass of the vehicle.

It should be appreciated that the foregoing concepts, and additional concepts discussed below, may be arranged in any suitable combination, as the present disclosure is not limited in this respect. It is envisioned that any feature of any embodiment may be combined with any other feature of any other embodiment. Further, other advantages and novel features of the present disclosure will become apparent from the following detailed description of various non-limiting embodiments when considered in conjunction with the accompanying figures. Further, it should be understood that the various features illustrated or described in connection with the different exemplary embodiments described herein may be combined with features of other embodiments or aspects. Such combinations are intended to be included within the scope of the present disclosure.

DETAILED DESCRIPTION

Inventors have realized that there is often a trade-off between force capability of an actuator and the response time of an actuator. The apparatus and methods described herein at least partially overcome this disadvantage of actuator systems for applications where high force and fast response time are desired. In one embodiment, an actuator is disclosed that has increased force capability for low speed events, and decreased force capability but faster response times for high speed events. It is contemplated that such an actuator may find application in an active suspension system of a vehicle, in which both high force capability and fast response times are desirable.

Figure 1:
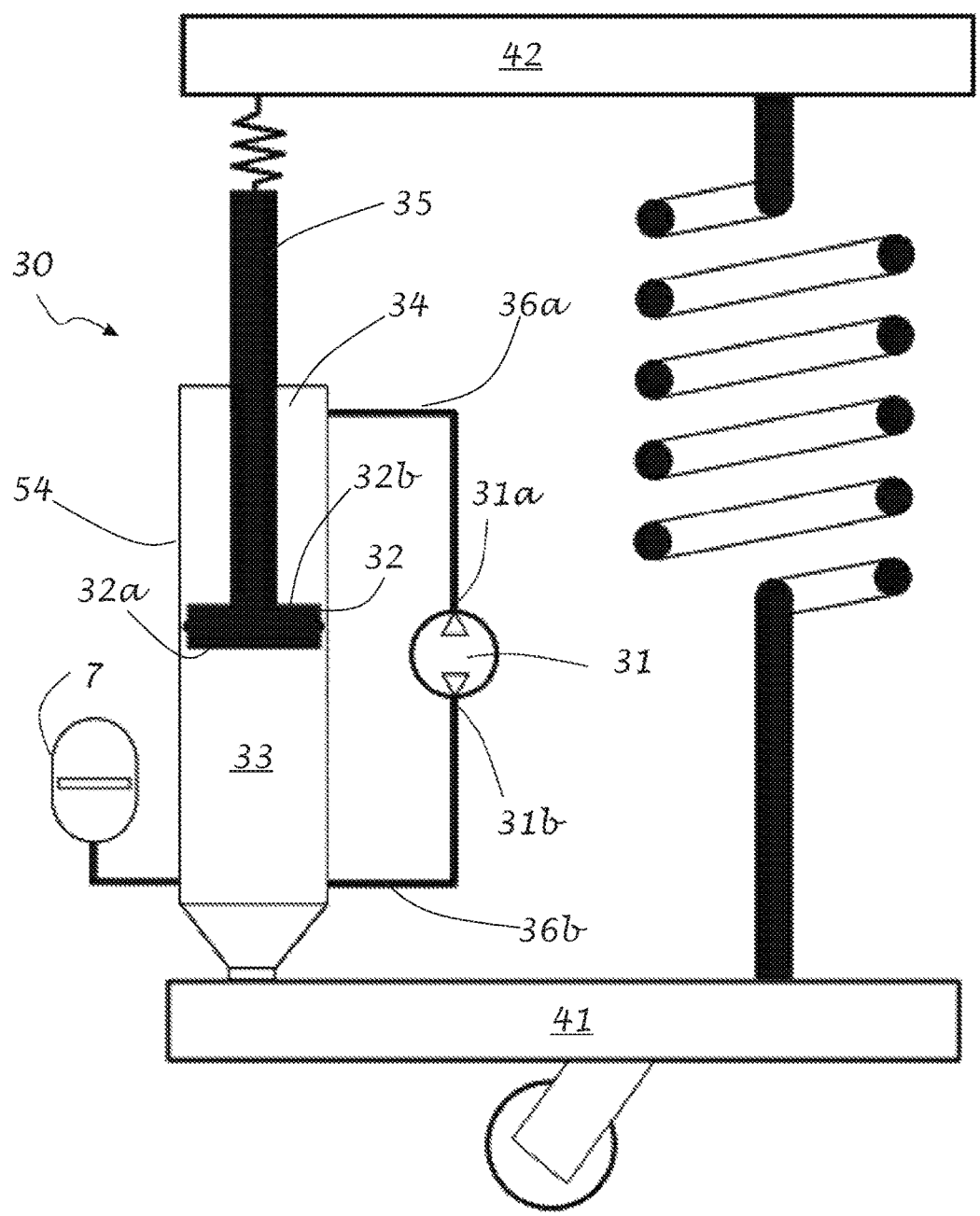
FIG. 1 illustrates an embodiment of a hydraulic actuator with a compression side accumulator.

Turning now to the figures, several non-limiting embodiments are described in detail. FIG. 1 illustrates an exemplary suspension system including a hydraulic actuator 30. The illustrated hydraulic actuator includes a hydraulic cylinder with a piston 32 slidably received in at least a portion of the hydraulic cylinder. The actuator illustrated in FIG. 1 also includes a compression chamber 33 partially defined by a first face 32a of the piston 32, an extension chamber 34 partially defined by a second face 32b of the piston, and a piston rod 35 attached to the second face of the piston. The illustrated hydraulic actuator further comprises a pump 31, a compression-side flow path 36a that allows for fluid exchange between the compression chamber 34 and port 31a of the pump 31, and an extension-side flow path 36b that allows for fluid flow from the extension chamber to the pump. Notably, the illustrated actuator embodiment includes only a single accumulator 7 located on the compression-side of the actuator, i.e. is in fluid communication with compression volume 33. In certain embodiments, the pump may be configured to function as both a hydraulic pump in an active mode and as a hydraulic motor in a regenerative mode. In certain embodiments, the pump may be replaced with a hydraulic motor configured to function as both a hydraulic pump in an active mode and as a hydraulic motor in a regenerative mode.

As described in more detail herein, pressure generated by the pump or a hydraulic motor, being used as a pump, may act on the piston to produce active forces and/or resistive forces on the piston. An active force on the piston is a net hydraulic force that acts on the piston in the direction of motion of the piston. A resistive force is a net hydraulic force that acts on the piston opposite to the direction of motion of the piston. The accumulator 7 may be in fluid communication with the compression volume, and may serve to accept the volume of fluid displaced by the rod when the rod penetrates further into the damper body.

Figure 2:
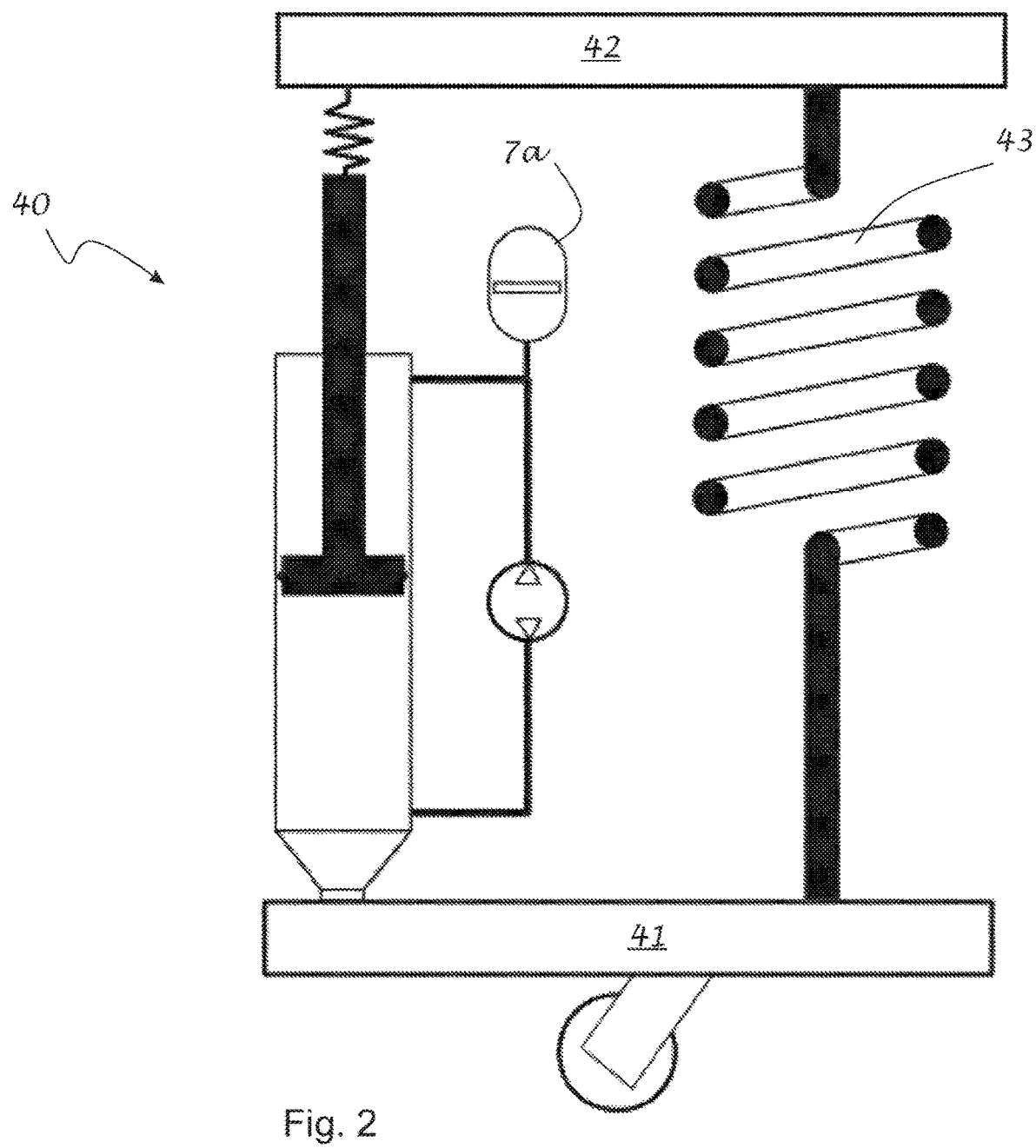
FIG. 2 illustrates an embodiment of a hydraulic actuator with an extension side accumulator.
Figure 3:
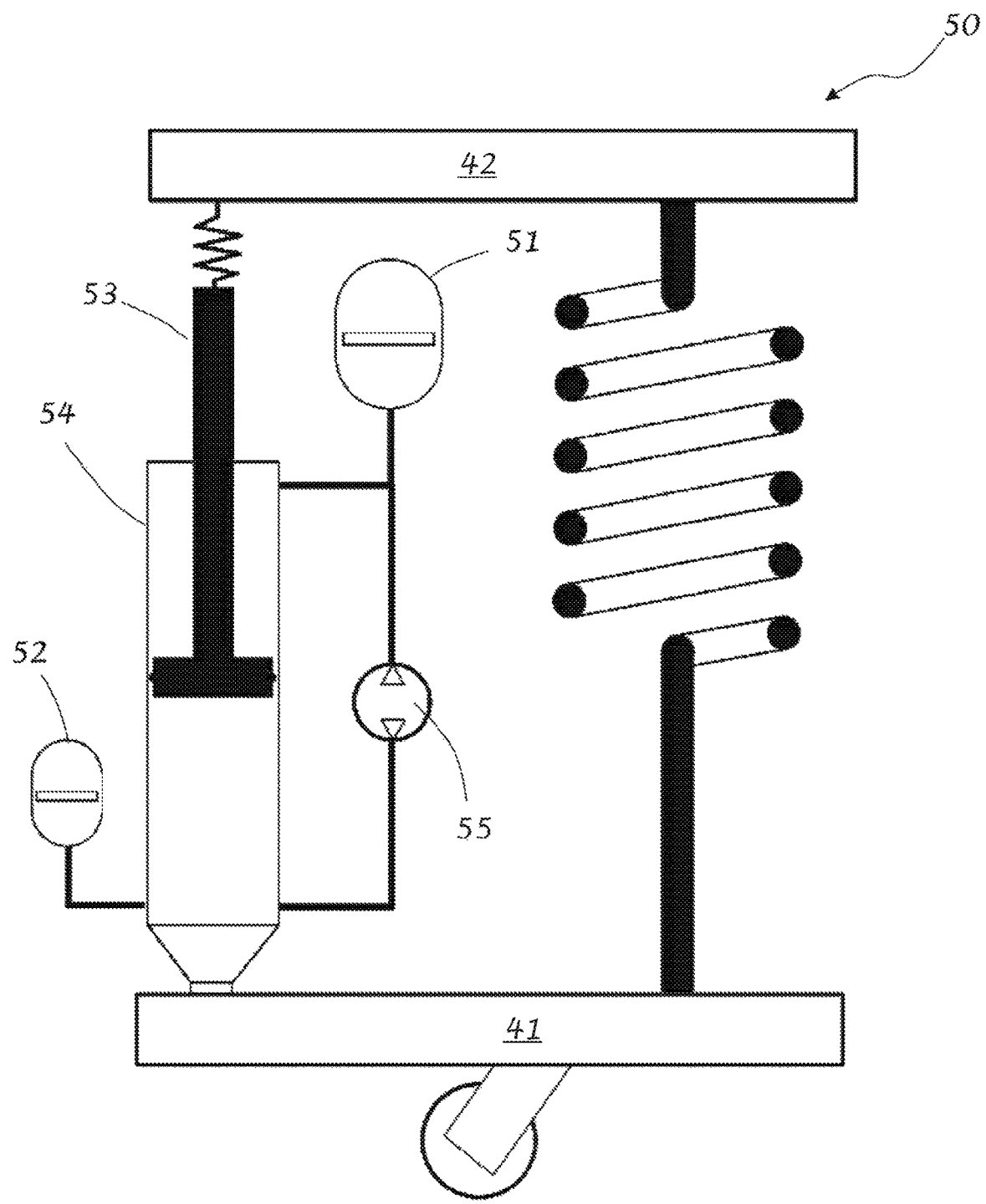
FIG. 3 illustrates an embodiment of a hydraulic actuator with a compression side and an extension side accumulator.

FIG. 2 illustrates an alternative embodiment of a suspension system, wherein the hydraulic actuator comprises only a single accumulator 7a1 located on the extension-side of the actuator. FIG. 3 illustrates yet another alternative embodiment, in which the hydraulic actuator 40 includes two accumulators: a compression side-accumulator 52 in fluid communication with the compression chamber and/or an extension-side accumulator 51 in fluid communication with the extension chamber (e.g., fluidically connected to the extension-side flow path). In an exemplary application, the hydraulic actuator of any of FIGS. 1-3 may be interposed between a wheel assembly 41 of a vehicle (unsprung mass) and the body 42 of the vehicle (sprung mass), and may be arranged in parallel with a spring element 43 (e.g. a coil spring or an air spring).

The inventors have recognized that the number of accumulators and their fluidic placement, and in systems comprising more than one accumulators, the relative sizes of each accumulator, may substantially affect the overall behavior of the actuator. The following discussion illustrates how various pressures within different chambers of the actuator, and how output force produced by the actuator, are affected by placement and relative sizes of accumulators in the system. Inventors have realized that the size of the accumulator is indicative of the amount of gas and not simply the size of the accumulator housing. The gas volume establishes compliance of the accumulator and helps determine the compliance of a portion and/or the entire hydraulic system. However, other compliance elements or means for controlling compliance besides gas filled accumulators (e.g. accumulators with spring loaded pistons, compressible hydraulic fluids, flexible housings and hydraulic hoses with flexible walls) may be used as the disclosure is not so limited.

In the embodiment illustrated in FIG. 3, the actuator includes an hydraulic cylinder 54 with a piston 56 slidably received in at least a portion of the hydraulic cylinder with a compression chamber 57 partially defined by a first face 56a of the piston 56, and an extension chamber 58 partially defined by a second face 56b of the piston. The illustrated hydraulic actuator further includes a pump 55, a compression-side flow path 59a that allows for fluid flow between the compression chamber 57 and the pump 55, an extension-side flow path 59b that allows for fluid flow between the extension chamber 58 and the pump 55, a compression-side accumulator 52, and an extension-side accumulator 51.

When a torque is applied to the pump (or to a hydraulic motor being operated as a pump), the hydraulic device may generate a pressure differential, denoted $\Delta P_{pump}$, between the fluidic pressure in the extension chamber (denoted Pext) and fluidic pressure in the compression chamber (denoted Pcom).

$$\Delta P_{pump} = P_{ext} - P_{com} \qquad \text{Equation 1}$$

The pressure differential generated by the pump may be related to the torque applied to the pump via equation 2:

$$\Delta P_{pump} = E \frac{(\tau_{applied} - J\dot{\omega} - \tau_{drag})}{Disp} \qquad \text{Equation 2}$$

where $\tau_{applied}$ is the applied torque, J is the moment of inertia of the pump, $\tau_{drag}$ represents drag torque, E represents an efficiency factor (e.g., to account for mechanical efficiency of the pump and/or pressure drops associated with various flow paths), and Disp is the displacement volume of the pump. For a low-inertia pump operating under low drag conditions and assuming mechanical efficiency of 1, equation 2 may be reduced such that equation 2 may be used to acceptably approximate the pressure differential $\Delta P_{pump}$ generated as a result of a given applied torque.

$$\Delta P_{pump} = \frac{\tau_{applied}}{Disp} \quad \text{Equation 3}$$

For example, if a torque of +10 N·m is applied to a pump having a displacement of 2 cubic meters, a pressure differential of approximately 5 Pa will be generated by the pump. As indicated above, other parameters (e.g., additional efficiency factors, conversion factors for units, etc.), depending on specific pump and system design, may also affect the pressure differential generated by the applied torque.

Utilizing equation 3 (which assumes a mechanical efficiency of 1 and neglects inertia and drag) with exemplary displacement value of 2 cubic meters and an applied torque of +10 N·m, a pressure differential of +5 Pa may be generated by the pump (e.g., fluidic pressure in the extension chamber may be 5 Pa larger than fluidic pressure in the compression chamber); alternatively, when an applied torque of −10 N·m is applied to the pump, a pressure differential of −5 Pa is generated (e.g., fluidic pressure in the extension chamber may be 5 Pa less than fluidic pressure in the compression chamber) by the pump. It is noted that this sign convention of the applied torque may be reversed. The sign convention and the exemplary values discussed above are exemplary and are selected for illustrative purposes as the disclosure is not so limited.

As described above, the pressure differential $\Delta P_{pump}$ may be +5 Pa for an applied torque of +10 N·m. The inventors have recognized that it is possible to control the distribution of this differential pressure across the piston by controlling the relative stiffness of the system on the compression volume side relative to the stiffness on the extension volume side. The inventors have further recognized that by controlling this distribution, it is possible to achieve a range of forces on the piston for the same deferential pressure produced by the pump or hydraulic motor. The inventors have therefore realized that, by adjusting the stiffness and/or compliance of the compression-side of the actuator relative to the stiffness and/or compliance of the extension-side of the actuator (e.g., by adding one or more accumulators), it is possible to influence how fluidic pressure in the compression chamber and/or extension chamber responds to a torque applied to the pump.

For example, if the system in FIG. 3 is effectively symmetric (e.g., a stiffness of the compression chamber and compression side flow path is effectively equal to a stiffness of the extension chamber and extension side flow path), then a fluidic differential pressure produced by the pump would be divided equally between the compression and extension sides of the system. In the example described above where the differential pressure produced by the pump was +5 Pa, pressure of the extension chamber (denoted Pext in equation 1) would increase to +2.5 Pa above the static pressure or precharge pressure (i.e., the fluidic pressure of the system under static conditions at a time at which no torque may be applied to the pump, denoted Pstatic); likewise, a fluidic pressure of the compression chamber (denoted Pcom in equation 1) would decrease to −2.5 Pa below the static or precharge pressure. As a result, the pressure differential, $\Delta P_{pump}$, given by equation 1 is: Pext−Pcom=($P_{static}$+2.5 Pa)−($P_{static}$−2.5 Pa)=+5 Pa.

In a non-symmetric system, where the stiffness or compliance of the compression-side of the actuator is not effectively equal to the stiffness or compliance of the extension-side of the actuator, the pressure distribution would be different. For example, as illustrated in FIG. 1, a single accumulator may be utilized located on the compression-side of the actuator. In this case the gas volume of the compression-side accumulator is large such that the compression-side of the actuator (which includes the compression chamber, the compression-side flow path, and, if present, the compression-side accumulator) may be significantly softer than the extension-side of the actuator (which includes the extension chamber, the extension-side flow path, and, if present, the extension-side accumulator).

Similar to the discussion about the hydraulic system of FIG. 3 discussed above, if an applied torque of 10 N·m is applied to a pump of FIG. 1 with an exemplary displacement of 2 cubic meters, a pressure differential $\Delta P_{pump}$ of +5 Pa may be generated by the pump. However, in the case of the hydraulic system of FIG. 1, the fluidic pressure of the compression chamber will remain effectively constant at the static or precharge pressure (that is, Pcom=Pstatic), while the fluidic pressure of the extension chamber may increase to +5 Pa relative to the static or precharge pressure (that is, Pext=Pstatic+5 Pa). This behavior would be due to the softness of the compression-side of the actuator relative to the extension-side of the actuator. The overall $\Delta P_{pump}$ as determined by equation 1 is: Pext−Pcom=($P_{static}$+5 Pa)−($P_{static}$)=+5 Pa.

Thus, in the above example, while the pressure differential, $\Delta P_{pump}$, generated by the pump may be unaffected by addition of the compression-side accumulator (in each case it is +5 Pa), the magnitude of variation of fluidic pressure in the compression chamber ($\Delta P_{com}$) is substantially affected, as is the magnitude of the variation of fluidic pressure in the extension chamber ($P_{ext}$). Mathematically, the variation in fluidic pressure of the extension chamber (denoted $\Delta P_{ext}$) as compared to the static or precharge pressure (Pstatic) is a function of the compliance of the extension-side of the circuit (denoted Cext), the compliance of the compression-side of the circuit (denoted Ccom), and the pressure differential generated by the pump ($\Delta P_{pump}$) as determined by equation 4. Likewise, the variation in fluidic pressure of the compression chamber (denoted $\Delta P_{com}$) may be determined by equation 5.

$$\Delta P_{ext} = Pext - Pstatic = \quad \text{Equation 4}$$
$$\frac{Ccom}{Cext+Ccom}\Delta P_{pump} = \left(1 - \frac{Cext}{Cext+Ccom}\right)\Delta P_{pump}$$

$$\Delta P_{com} = Pcom - Pstatic = \frac{-Cext}{Cext+Ccom}\Delta P_{pump} \quad \text{Equation 5}$$

$$\Delta P_{pump} = Pext - Pcom = \Delta P_{ext} - \Delta P_{com} \quad \text{Equation 6}$$

As indicated by the above equations, if the system is symmetric (Cext=Ccom), then the magnitude of variation of fluidic pressure of the extension chamber ($\Delta P_{ext}$) is effectively equal to the magnitude of variation of fluidic pressure of the compression chamber ($\Delta P_{com}$). If the compression-side of the circuit is significantly softer than the extension-side of the actuator (that is, Ccom>>Cext), then variations in fluidic pressure of the extension chamber would account for effectively the entire generated pressure differential (that is, $\Delta P_{ext} \approx \Delta P_{pump}$). If, on the other hand, the extension-side of the actuator is much softer than the compression-side of the circuit, then variations in fluidic pressure of the compression chamber would account for nearly the entire generated pressure differential. Equations 4-6 can be rewritten in terms of respective stiffness values (i.e. the reciprocal of compliance) instead of compliance values.

In the embodiment illustrated in FIG. 3, which includes both an extension-side accumulator 62 and a compression-side accumulator 52. A first torque may be applied to the pump such that the pump to generates a pressure differential of +100 psi, and wherein the static or precharge (or resting) pressure of the system is 500 psi. Therefore, when effectively no torque is applied to the pump, the fluidic pressure in both the extension chamber (Pext) and the compression chamber (Pcom) would be 500 psi. When the first torque is applied to the pump, a pressure differential of +100 psi is generated across the pump (i.e. the fluidic pressure of the extension chamber would exceed that of the compression chamber by 100 psi). Such pressure differential can be accomplished a variety of ways, such as, for example:

[a] fluidic pressure of the extension chamber may be increased to 600 psi, while the fluidic pressure of the compression chamber remains effetively constant at 500 psi;
  [b] fluidic pressure of the extension chamber may be increased to 550 psi, while the fluidic pressure of the compression chamber is decreased to 450 psi; or
  [c] fluidic pressure of the extension chamber may remain constant at 500 psi, while the fluidic pressure of the compression chamber is decreased to 400 psi.

As should be evident from the analysis above, case [a] may occur when the compression-side of the circuit is much softer (lower stiffness and/or higher compliance) than the extension-side of the circuit; case [b] may occur when the system is symmetric; and case [c] may occur when the extension-side of the circuit is significantly softer than the compression-side of the circuit. Any of these exemplary cases [a]-[c] may be induced as a result of the same pressure differential of +100 psi. Inventors have realized that these different distributions result in different forces being applied to the piston.

The force transmitted to the piston along a direction parallel to the longitudinal axis of the piston rod (denoted F) is given by equation 7 or 8 below, where $P_{ext}$ is the fluidic pressure in the extension chamber, $P_{com}$ is the fluidic pressure in the compression chamber, $A_{ext}$ is the area of the face of the piston that is exposed to fluid pressure in the extension chamber that results in a force in the longitudinal direction, $A_{com}$ is the area of the face of the piston that is exposed to fluid pressures in the compression chamber that results in a force in the longitudinal direction, and $\Delta A = A_{com} - A_{ext}$.

$$F = P_{ext} * A_{ext} - P_{com} * A_{com} \qquad \text{Equation 7}$$

$$F = P_{ext} * (A_{com} - \Delta A) - P_{com} * A_{com} \qquad \text{Equation 8}$$

Assuming the piston and piston rod both possess a circular cross-sectional area, the values $A_{ext}$, $A_{com}$, and $\Delta A$ can be related to the diameter of the piston (Dpiston) and diameter of the piston rod (Drod) using equations 9-11 below.

$$A_{com} = \text{pi} * (D\text{piston}/2)^2 \qquad \text{Equation 9}$$

$$A_{ext} = \text{pi} * (D\text{piston}/2)^2 - \text{pi} * (D\text{rod}/2)^2 \qquad \text{Equation 10}$$

$$\Delta A = A_{rod} \text{pi} * (D\text{rod}/2)^2 \qquad \text{Equation 11}$$

For an embodiment where the diameter of the piston is 10 inches, yielding an Acom value of 25*pi square inches. If the diameter of the piston rod is 2 inches Aext would equal 24*pi square inches. The dimensions of the embodiment are exemplary as the disclosure is not so limited, and indeed the discussion would be applicable for any appropriate piston and rod combination.

Considering case [a] above (Pext=600 psi, Pcom=500 psi) and utilizing equation 4, a force having a magnitude of 1900*pi pounds is transmitted to the piston in response to the 100 psi pressure differential generated by the pump. For case [b] above (Pext=550 psi, Pcom=450 psi), a force having a magnitude of 1950*pi pounds is transmitted to the piston in response to the +100 psi pressure differential generated by the pump. For case [c] above (Pext=500 psi, Pcom=400 psi), a force having a magnitude of 2000*pi pounds is transmitted to the piston in response to the +100 psi pressure differential generated by the pump.

As is evident from the above discussion, the same applied torque and the same generated pressure differential $\Delta P_{pump}$ by the pump may result in different forces being transmitted to the pump depending on the relative stiffnesses or compliances of the compression side of the circuit relative to the extension side of the circuit. Combining equations 2-11, the force transmitted to the piston (F) may be related to a generated pressure differential ($\Delta P_{pump}$) by equation 12.

$$F = \Delta P_{pump} \left( A_{ext} + \frac{C_{ext}}{C_{ext} + C_{com}} \Delta A \right) + K \qquad \text{Equation 12}$$

Substituting for $\Delta P_{pump}$ using equation 3 allows the force transmitted to the piston to be further related to the applied torque and the displacement of the pump.

$$F = \frac{\tau_{applied}}{Disp} \left[ A_{ext} + \frac{C_{ext}}{C_{ext} + C_{com}} \Delta A \right] + K \qquad \text{Equation 13}$$

Equation 13 may be rearranged in order to yield a ratio ($F/\tau_{applied}$) between the force transmitted to a piston and a torque applied to the pump, as shown in equation 14. This ratio may be referred to as a motion ratio of the actuator, denoted $R_{motion}$.

$$R_{motion} \propto \frac{F}{\tau_{applied}} = \frac{1}{Disp} \left[ A_{ext} + \frac{C_{ext}}{C_{ext} + C_{com}} \Delta A \right] \qquad \text{Equation 14}$$

Equation 14 was derived from equations 1-13, assuming no mechanical loss, hydraulic loss, drag, or inertia; as would be recognized by one of ordinary skill, however, additional factors, including, for example, those shown in equation 2, may be incorporated into equation 13. The term "K" in equation 13 used to account for any static forces that are placed on the rod as a result of internal static pressure on the rod area.

As shown in equation 15, the motion ratio ($R_{motion}$) may alternatively be expressed in units of angular rotation of the pump (e.g., in units of radians) to linear displacement of the piston (e.g., in units of meters). In this light, the motion ratio ($R_{motion}$) may be thought of as relating the angular displacement of the pump (denoted θ) to linear displacement of the piston (denoted D), higher motion ratios indicate more rotation of the pump in response to a given linear motion of the piston.

$$R_{motion} \propto \frac{\theta}{D} = \frac{1}{Disp}\left[A_{ext} + \frac{C_{ext}}{C_{ext} + C_{com}}\Delta A\right] \quad \text{Equation 15}$$

The steady state active force produced by the system can, therefore, be determined by the applied torque multiplied by the motion ratio. As can be seen from equation 14, in order to maximize the force transferred in response to a given applied torque, it may be desirable in certain embodiments for the extension-side of the circuit to be softer than the compression-side of the circuit (leading to a higher motion ratio). This can be accomplished, for example, by placing an accumulator only on the extension-side of the circuit (e.g., along the extension-side flow path) and not on the compression-side of the circuit; or by using both an extension-side accumulator and a compression-side accumulator, wherein the extension-side accumulator is much larger (e.g., has a larger gas volume) or softer than the accumulator on the compression-side of the circuit.

In automotive applications, it is contemplated that a hydraulic actuator, such as, for example, those illustrated herein, may be utilized to minimize oscillating motions (e.g., vibrations) of one or more components of the vehicle.

An oscillating applied torque may be specified by both a frequency of the oscillations, and by an amplitude of the oscillations. For example, a first torque of +10 N·m may be applied to the pump for 0.5 s, immediately after which a second torque of −10 N·m may be applied to the pump for 0.5 s. This cycle may be repeated any number of times, yielding a periodic applied torque profile. Such periodic applied torque profile has a frequency of 1 Hz (1 full cycle per second) and an amplitude of 10 N·m. Alternatively, instead of periodic step input, the input may oscillate according to a sinusoidal wave, or according to any other regular or irregular waveform.

In case of an oscillating applied torque, equation 3 may be modified to express the generated pressure differential as a function of time:

$$\Delta P_{pump}(t) = \frac{\tau_{applied}(t)}{Disp} \quad \text{Equation 15a}$$

Given a periodically oscillating applied torque, the pressure differential $\Delta P_{pump}$ generated by the pump may periodically vary with time. In the case of an exemplary displacement value of 2 cubic meters, when an torque of +10 N·m is applied to the pump, a pressure differential ($\Delta P_{pump}$) of +5 Pa is generated (e.g., fluidic pressure in the extension chamber is 5 Pa larger than fluidic pressure in the compression chamber), while when a torque of −10 N·m is applied to the pump, a pressure differential ($\Delta P_{pump}$) of −5 Pa is generated (e.g., fluidic pressure in the extension chamber is 5 Pa less than fluidic pressure in the compression chamber). It is noted that this sign convention is arbitrary, and may be reversed without affecting the fundamental analysis herein.

Continuing with the above exemplary case, as the applied torque oscillates between +10 N·m and −10 N·m, the resulting pressure differential $\Delta P_{pump}(t)$ generated by the pump correspondingly oscillates between +5 Pa and −5 Pa. The amplitude of this exemplary oscillating pressure differential, $\Delta P_{pump}(t)$, is therefore 5 Pa, and the peak-to-peak amplitude is 10 Pa. For the purposes of this disclosure, the amplitude of any oscillating value, v(t), may be expressed using the nomenclature $\hat{A}\{v(t)\}$. For example, the amplitude of an oscillating pressure differential may be represented as $\hat{A}\{\Delta P_{pump}(t)\}$, and may be related to the amplitude of the oscillating applied torque by equation 15b.

$$\hat{A}\{\Delta P_{pump}(t)\} = \frac{\hat{A}\{\tau_{applied}(t)\}}{Disp} \quad \text{Equation 15b}$$

It is noted that, as with equation 3, equations 15a-b assume an efficiency value of 1 and neglects drag torque and inertial effects. Equations 15a-b may be modified by one of ordinary skill in the art to account for such additional factors.

An oscillating pressure differential $\Delta P_{pump}(t)$ causes oscillations in the fluidic pressure of the extension chamber relative to the static or precharge pressure ($\Delta$Pext(t)), and/or in the fluidic pressure of the compression chamber relative to the static or precharge pressure ($\Delta$Pcom(t)). The amplitude of Pext(t) and $\Delta$Pext(t) may be represented by equation 16, while the amplitude of Pcom(t) and $\Delta$Pcom(t) may be represented by equation 17.

$$\hat{A}\{\Delta P_{ext}(t)\} = \hat{A}\{P_{ext}(t)\} = \left(1 - \frac{C_{ext}}{C_{ext} + C_{com}}\right) * \hat{A}\{\Delta P_{pump}(t)\} \quad \text{Equation 16}$$

$$\hat{A}\{\Delta P_{com}(t)\} = \hat{A}\{P_{com}(t)\} = \frac{C_{ext}}{C_{ext} + C_{com}} * \hat{A}\{\Delta P_{pump}(t)\} \quad \text{Equation 17}$$

As can be seen by examination of equation 16-17, if the system is symmetric ($C_{com}=C_{ext}$), then the amplitude of $\Delta$Pext(t) and $\Delta$Pcom(t) are theoretically equal. If the compression-side of the circuit is much softer than the expression side of the circuit ($C_{com} \gg C_{ext}$), then the amplitude of $\Delta P_{com}(t)$ is lower than that of $\Delta P_{ext}(t)$ (that is, the fluidic pressure of the compression chamber remains relatively constant compared to that of the extension chamber).

These oscillations in fluidic pressures of the extension chamber and/or compression chamber may thereby cause the force transmitted to the piston to oscillate. In the case of oscillating torques, pressures, and/or force, the motion ratio may be expressed as a ratio of the amplitude of F(t) (the force transmitted to the piston) over the amplitude of the applied torque, as shown in Equation 18. Alternatively, the motion ratio in response to oscillating input (denoted Řmotion for clarity) may be expressed as a ratio of the amplitude of angular displacement of the pump (e.g., in units of radians) over the amplitude of linear displacement of the piston (e.g., in units of meters), as shown by equation 19.

$$\check{R}_{motion} = \frac{\hat{A}\{F(t)\}}{\hat{A}\{\tau_{applied}(t)\}} = \frac{1}{Disp}\left[A_{ext} + \frac{C_{ext}}{C_{ext} + C_{com}}\Delta A\right] \quad \text{Equation 18}$$

$$\check{R}_{motion} = \frac{\hat{A}\{\theta(t)\}}{\hat{A}\{D(t)\}} = \frac{1}{Disp}\left[A_{ext} + \frac{C_{ext}}{C_{ext} + C_{com}}\Delta A\right] \quad \text{Equation 19}$$

Analogous to the discussion of equation 14, it can be seen that the motion ratio (and therefore force capability for a given applied torque) may be increased by increasing the compliance of the extension-side of the circuit relative to the compression-side of the circuit.

The inventors have recognized that, especially for automotive suspension applications, it may be advantageous to design a hydraulic system having an increased force capability and motion ratio for low speed events (e.g., low-frequency oscillating motions), while having decreased motion ratio and force capability—but faster response time—for high speed events (e.g., high-frequency oscillating motion). Low frequency motion may be associated with control of a vehicle body ('body control'), and may occur, for example, when lifting up or lowering a vehicle in order to traverse a large pothole or large bump. For low speed events or low-frequency oscillating motion, it may be desirable to have high force capability in order to achieve the desired control over accelerations of the vehicle body relative to one or more wheels of the vehicle. As discussed above, force capability may be increased by increasing the motion ratio, e.g. by increasing the compliance of the extension-side of the circuit relative to the compliance of the compression-side of the circuit.

Increasing the compliance of the extension-side of the circuit also acts to slow the response time of the actuator. A given response time may be negligible compared to the duration of a low speed event (or period of a low-frequency oscillation), but may become significant compared to the duration of a high speed event (or period of high frequency oscillation). For example, a response time of 0.05 s may be negligible for a low-speed event having a duration of 1 s. However, the same 0.05 s response time is significant for an event having a duration of 0.1 s. Therefore, for high speed events or high frequency oscillations, response time and bandwidth become a greater concern than force capability, and it may be advantageous to sacrifice force capability in return for improved response time. This may be done by, for example, decreasing the relative compliance of the extension-side of the actuator, leading to a decreased motion ratio. Additionally, decreasing the motion ratio of the actuator for high speed events may also act to minimize the transmission of high speed wheel inputs from the wheel to the vehicle body. Additionally or alternatively, reducing the motion ratio for high speed events may help to reduce the inertia effects of the pump on the vehicle suspension system.

In light of the above analyses, the inventors have realized that it may be advantageous to design a hydraulic actuator in which the motion ratio of the actuator may be dynamically varied. This may be accomplished by dynamically varying the stiffness and/or compliance of the extension-side of the actuator and/or the stiffness and/or compliance of the compression-side of the actuator. For example, for low frequency oscillations in pressures, it may be desirable to increase the compliance of the extension-side of the circuit relative to the compression-side of the circuit, thereby maximizing motion ratio and force capability for a given torque. For high frequency oscillations, it may be desirable to decrease the compliance of the extension-side of the actuator relative to the compression-side of the actuator, thereby speeding up the response time of the system at the expense of force capability.

Figure 4:
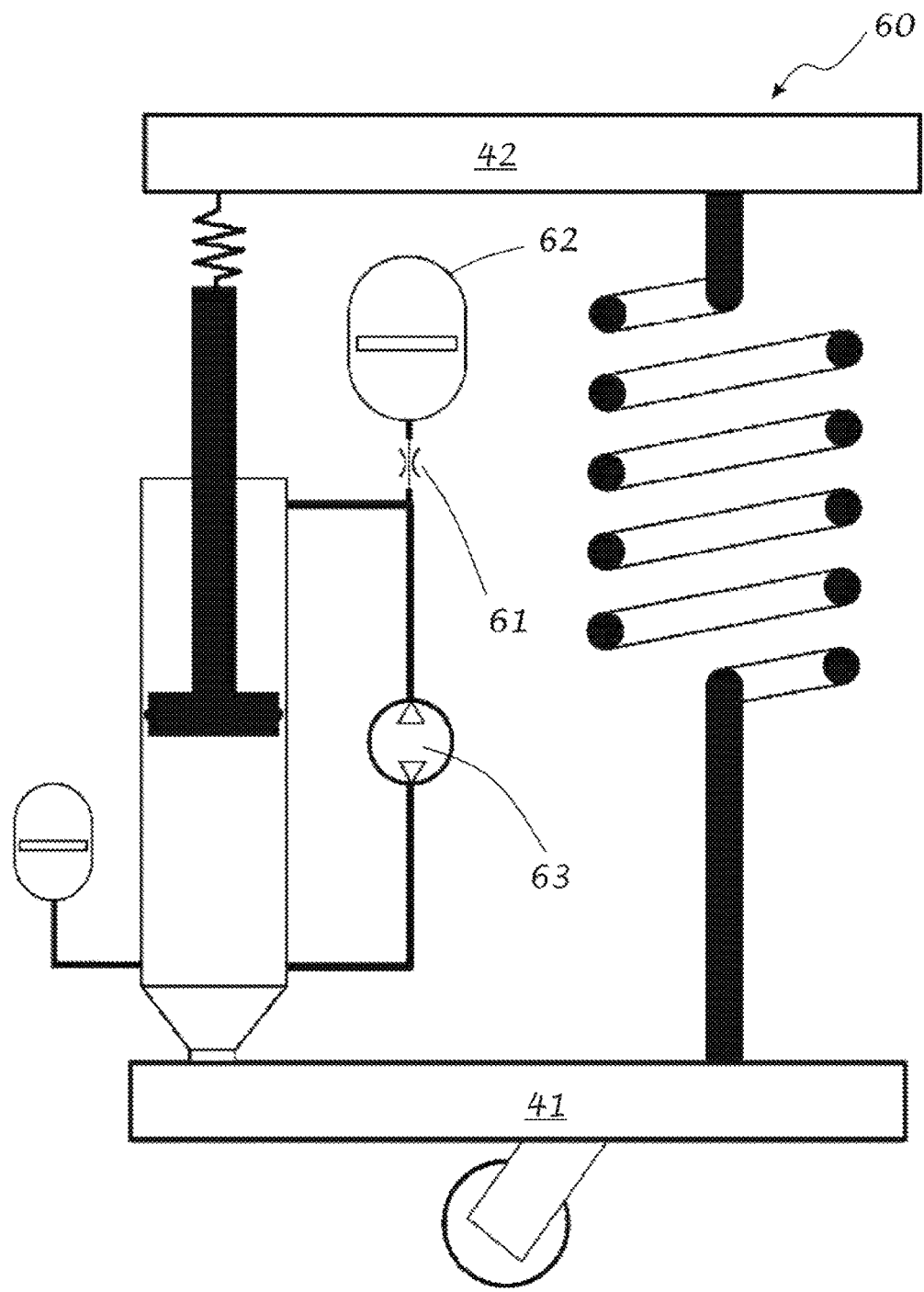
FIG. 4 illustrates the hydraulic actuator of FIG. 3 with a restriction element in the path of the extension side accumulator.

FIG. 4 illustrates an exemplary corner of a suspension system including a hydraulic actuator 64 having a dynamically variable motion ratio. The actuator 64 of the exemplary embodiment illustrated in FIG. 4 includes a pump 63, a compression-side accumulator 66, and an extension-side accumulator 62. The hydraulic actuator 64 further includes a restriction element 61 fluidically disposed between the pump 63 and the extension-side accumulator 62. In certain embodiments, the restriction element 61 may include one or more of a restriction, a passive valve, a shim stack, and an actively controlled valve. An actively controlled valve may be, for example, an electrically controlled valve, a hydraulically controlled valve, or a pneumatically controlled valve.

In some embodiments the restriction element 61 may be a valve. When the valve is open, the extension-side of the circuit may have a first compliance (also a first stiffness). When this valve is closed, the extension-side of the circuit may have a second compliance that may be less than the first compliance and/or a second stiffness greater than the first stiffness (that is, the extension-side of the circuit becomes stiffer upon closing the valve). In certain embodiments, this valve may be an electrically or electromechanically actuated valve (e.g. a solenoid valve, a servo valve). In certain embodiments, a controller may be configured to at least partially open the valve when the frequency of oscillating motion of the pump (e.g., oscillating rotary motion), oscillating motion of the piston (e.g., oscillating linear motion), and/or oscillations in fluidic pressure in any part of the actuator is below a first threshold frequency. Likewise, the controller may be configured to at least partially close the valve when the frequency of oscillating motion of the pump, oscillating motion of the piston, and/or oscillations in fluidic pressure in any part of the actuator is above a second threshold frequency.

In certain embodiments, a vehicle may have a suspension system that includes a hydraulic actuator according to any embodiment disclosed herein. Additionally, the vehicle may include one or more "look ahead" sensors, such as a camera, a LIDAR system, a RADAR system, etc. The look ahead sensor may be configured to collect information about the ground surface ahead of the vehicle. A set of one or more controllers may be configured to receive information from the one or more look ahead sensors, and to determine a characteristic (e.g., a frequency, a peak frequency, a power spectral density) of an expected input based on the received information. For example, a certain road feature may be known to result in a certain input having a certain characteristic. In certain embodiments, the set of controllers may be further configured to adjust the restriction element (e.g., at least partially open a valve, at least partially close a valve) based on the characteristic (e.g., a frequency) of the expected input.

Alternatively, the restriction element 61 may be or may include, for example, an orifice or a restriction that is tuned such that the extension-side accumulator effectively "cuts off" for pressure oscillations above a threshold frequency. For low frequency inputs, the flow restriction may allow fluid flow in and out of the extension-side accumulator 62 with minimal interference, leading to the extension-side of the actuator having a relatively high compliance (e.g., a relatively high $C_{ext}$ value) and, therefore, a higher motion ratio. However, at higher frequency inputs above the threshold frequency (e.g., above the cutoff frequency of the flow restriction), the extension-side accumulator is essentially cut-off from the rest of the actuator. Therefore, only a minimal amount of fluid flow may pass into the extension-side accumulator since it is choked by the restriction. This reduces the effective motion ratio of the actuator by decreasing the compliance of the extension-side of the actuator relative to the compliance of the compression-side of the actuator (e.g., by decreasing $C_{ext}$ relative to $C_{com}$). For reasons discussed previously, if the actuator 64 is used as an active suspension system, improved ride comfort may achieved in the presence of high frequency road inputs due to the decreased motion ratio, thereby minimizing the amount of energy transferred into a vehicle body 60. The reduced motion ratio may also help to reduce the inertia effects of the pump on the vehicle suspension system.

Alternatively, the restriction element 61 may be, for example, a shim stack. Due to the pressure response of a shim stack, when the rate of fluidic pressure change in the extension-side of the actuator is sufficiently fast, the shim stack may remain closed or effectively closed. When the rate of fluidic pressure change in the extension-side of the actuator is sufficiently slow, the shim stack may at least partially open, thereby increasing compliance and decreasing stiffness of the extension-side of the actuator.

The restriction element may be tuned by, for example, utilizing computational fluid dynamic simulations to identify desired inertance and/or impedance characteristics of the restriction element based on desired frequency response, and subsequently designing the restriction element to match the desired inertance and/or impedance characteristics according to known methods in the art. Alternatively or additionally, for initial evaluation, an adjustable valve (such as, for example, a needle valve) may be utilized and adjusted until the desired frequency response is obtained. Once the desired frequency response is obtained, the properties of the needle valve that yield the desired response may be evaluated, and the restriction element may be designed or tuned to have similar properties.

Figure 5:
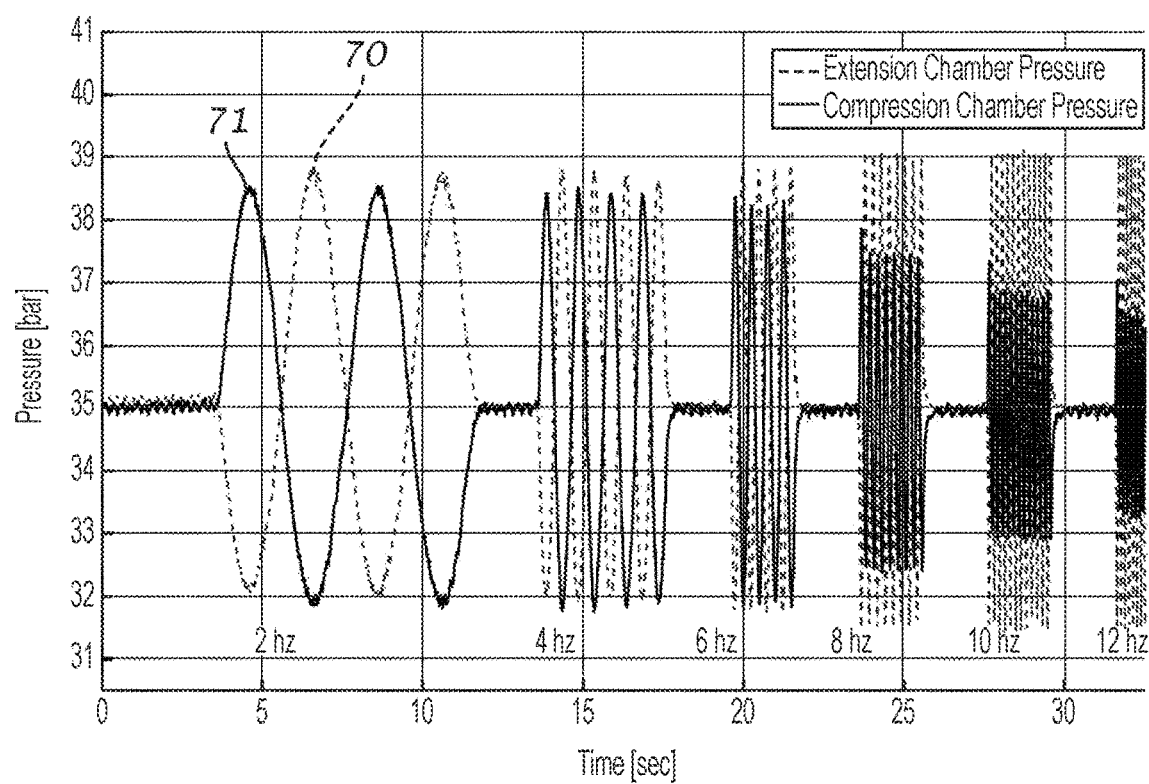
FIG. 5 demonstrates an example of the frequency dependence of the relative pressure factor for a hydraulic actuator.

FIG. 5 illustrates the response of an actuator having a frequency dependent motion ratio (such as the embodiment illustrated in FIG. 4) to oscillating inputs of different frequencies. For the actuator evaluated to produce FIG. 5, the size of the extension-side accumulator 62 is approximately equal to the size of the compression-side accumulator 66. For oscillating inputs of a low frequency (e.g., 2 Hz), the restriction element 61 allows fluid to freely flow to and from the extension-side accumulator, resulting in approximately equal compliance in the compression-side and the extension-side of the actuator (that is, Cext≈Ccom). Since Cext≈Ccom at 2 Hz the amplitude of oscillations of extension chamber pressure 70 Pext(t) and compression chamber pressure 71 Pcom(t) are approximately equal (as suggested by equations 16-17 above). As the frequency of oscillations increase, the restriction element 61 progressively begins to restrict flow to and from the extension-side accumulator. Therefore, for oscillating inputs at a high frequency (e.g. 12 Hz), the extension-side accumulator is at least partially choked off from the rest of the actuator, leading to a decrease in compliance of the extension-side of the accumulator (in other words, at high frequencies, Ccom>Cext). Since Ccom>Cext for inputs of a sufficiently high frequency (e.g., 12 Hz), the amplitude of oscillations of Pcom(t) are less than the amplitude of oscillations of Pext(t) (as suggested by equations 16-17 above).

Figure 6:
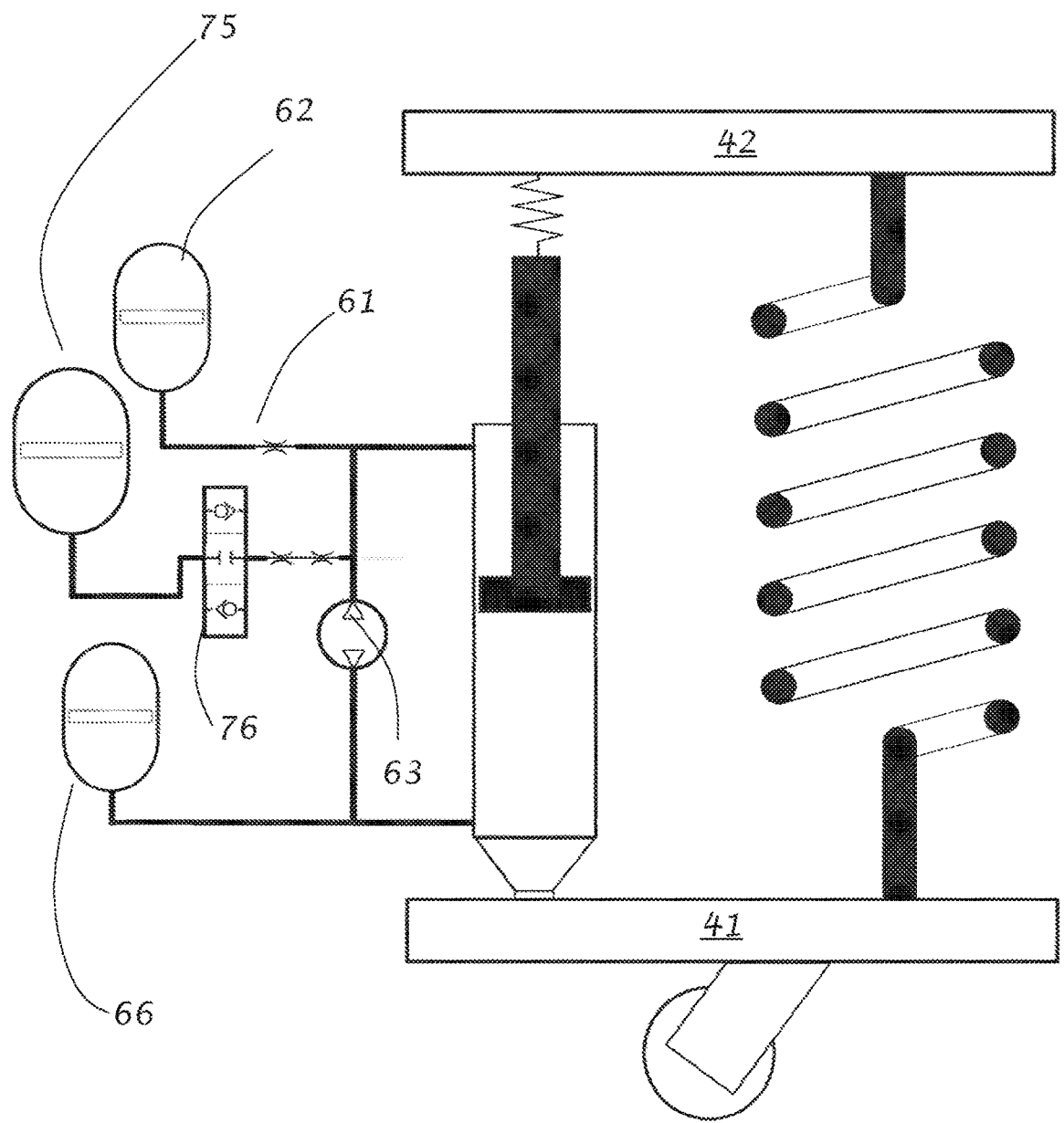
FIG. 6 illustrates an embodiment of a hydraulic actuator with a compression side accumulator and two extension side accumulators.

In certain embodiments, actuator behavior may be managed further by utilizing a second extension-side accumulator 75 and a second restriction element 76, as shown in FIG. 6. This second restriction element may include one or more of a valve (e.g., a spool valve, an electrically or electromechanically actuated valve, a variable restriction or orifice, or any other type of appropriate valve), a shim stack, or a static restriction or orifice. The principle of operation of the second extension-side accumulator is similar to that described above; when the second restriction element allows fluid to freely pass to the second extension-side accumulator, the compliance of the extension-side is higher than when the second restriction element blocks or impedes fluid flow to the second-extension side accumulator. The first hydraulic device and second hydraulic device may be tuned to have different thresholds or cut-off frequencies, so that three stage control is possible.

As shown in equations 16-19, the amplitude of pressure oscillations in the extension chamber and compression chamber, and the motion ratio, all depend on the factor $$\frac{C_{ext}}{C_{ext} + C_{com}}.$$

This factor describes a ratio of compliance of the extension-side of the actuator over the total compliance of the actuator (i.e., the sum of the compliance of the extension-side of the actuator and the compression side of the actuator). For clarity, this factor will be referred to as the "relative compliance factor" and will be denoted $\check{C}$.

As is evident from the above discussion, in one aspect of this disclosure, the inventors aim to describe the design and benefits of a hydraulic actuator having a relative compliance factor $\check{C}$ that dynamically varies based on, for example, the frequency of an oscillating input or another property (such as, e.g., the speed or duration) of an input. In theory, consideration of the relative compliance factor is quite useful for derivations of relevant equations; however, in practice, when presented with a hydraulic actuator, the relative compliance factor may be quite difficult or complex to determine. The inventors therefore introduce a related factor referred to as the "relative pressure factor," denoted $\rho$, that is defined by equation 20.

$$\rho = \frac{\hat{A}\{\Delta P_{ext}(t)\}}{\hat{A}\{\Delta P_{com}(t)\}} = \frac{\hat{A}\{P_{ext}(t)\}}{\hat{A}\{P_{com}(t)\}} \qquad \text{Equation 20}$$

As shown, the relative pressure factor $\rho$ represents the ratio of the amplitude of oscillations in fluidic pressure of the extension chamber over the amplitude of oscillations in fluidic pressure of the compression chamber in response to an oscillating input. In cases in which the pressure of the extension chamber (Pext) and/or the pressure of the compression chamber (Pcom) oscillates in an irregular fashion (i.e., according to an irregular waveform) in response to a given oscillating input, it is understood that the term "amplitude" as used herein refers to the root mean square (RMS) amplitude of the oscillations in respective pressure.

Based on the above equations, it can be shown that the relative pressure factor $\rho$ may be mathematically related to the relative compliance factor $\check{C}$ by equation 21.

$$\rho = \check{C}^{-1} - 1 \qquad \text{Equation 21}$$

The below table depicts values for the relative compliance factor $\check{C}$ and the relative pressure factor $\rho$ for various configurations of a hydraulic actuator. As can be seen, when the system is symmetric (the compliance of the extension-side equals the compliance of the compression-side, or Cext=Ccom), the relative compliance factor $\check{C}$ is 0.5 and the relative pressure factor $\rho$ is 1. When the extension-side is softer than the compliance-side (Cext>Ccom), the relative compliance factor $\check{C}$ is greater than 0.5, and the relative pressure factor $\rho$ is less than 1. When the compression-side is softer than the extension-side (Ccom>Cext), the relative compliance factor $\check{C}$ is less than 0.5, and the relative pressure factor $\rho$ is greater than 1.

|  | $C_{ext} = C_{com}$ | $C_{ext} > C_{com}$ | $C_{ext} < C_{com}$ |
|---|---|---|---|
| Relative compliance factor $\check{C}$ | 0.5 | >0.5 | <0.5 |
| Relative pressure | 1 | <1 | >1 |

|  | $C_{ext} = C_{com}$ | $C_{ext} > C_{com}$ | $C_{ext} < C_{com}$ |
|---|---|---|---|
| factor ρ | | | |
| Notes | | higher motion ratio and force output | lower motion ratio and force output |

As shown, the force capability of the system (and motion ratio) is inversely proportional to the relative pressure factor: that is, lower relative pressure factors lead to higher force capability and motion ratios and higher relative pressure factors lead to lower force capability and motion ratios. As evident from the above discussion of dynamically controlled hydraulic actuators, preferably an actuator will exhibit a first relative pressure factor for oscillating inputs of a frequency below a first threshold, and a second relative pressure factor that is higher than the first relative pressure factor for oscillating inputs of a frequency above a second threshold, wherein the second threshold is equal to or greater than the first threshold. In certain embodiments, the first threshold may be below a wheel-hop frequency of a vehicle and the second threshold may be above the wheel-hop frequency of the vehicle. In certain embodiments, the first and second threshold may fall within the range of 3 Hz-7 Hz. Preferably, the first relative pressure factor is 1 or less than 1, and/or the second relative pressure factor is greater than 1.

For example, returning to FIG. 5, for inputs of low frequencies (e.g., 2 Hz, e.g., below the cutoff frequency of the restriction element 61), the evaluated actuator exhibits a relative pressure factor ρ of approximately 1. However, as the frequency of the input increases, the relative pressure factor ρ can be seen to increase, such that at high frequencies (e.g., 8 Hz, 10 Hz, 12 Hz) the relative pressure factor ρ is greater than 1.

Therefore, the preferred properties of the actuator may be defined in terms of, for example, a relative compliance factor or a relative pressure factor. However, as noted above, in practice it may be easier to determine the relative pressure factor of a given actuator as opposed to the relative compliance factor of the actuator.

The relative pressure factor of a given actuator in response to an oscillating input of a given frequency may be determined as follows. A first pressure sensor may be placed in the extension chamber of the actuator, and a second pressure sensor may be placed in the compression chamber of the actuator. The piston rod may be held in place (e.g., using a dynamometer) with the piston located at approximately mid-stroke. With the piston rod held in place, an oscillating torque of a first frequency may be applied to the pump (e.g., to the shaft of the pump), thereby causing the fluidic pressure in the extension chamber to oscillate and/or the fluidic pressure in the compression chamber to oscillate. The amplitude of oscillations of fluidic pressure in the extension chamber and the amplitude of oscillations of fluidic pressure in the compression chamber may be determined using the first pressure sensor and second pressure sensor, respectively. The ratio of these amplitudes then gives the relative pressure factor. In order to determine a frequency dependence of the relative pressure factor, the test may be repeated using an oscillating torque of a different frequency and the same amplitude.

Alternatively, the relative pressure factor of a given actuator in response to an oscillating input of a given frequency may be determined by locking the pump in place (e.g., by preventing rotation of the pump's shaft) and oscillating the position of the piston (e.g., by applying an oscillating force to an end of the piston rod, thereby causing the piston to move up and down relative to the housing of the hydraulic cylinder). For example, the actuator may be placed in a dynamometer and the piston may be moved to approximately mid-stroke. A brake or other mechanical device may be used to lock the pump in place, so that it cannot rotate. The position of the piston may be oscillated according to a first frequency, thereby causing the fluidic pressure of the extension chamber to oscillate and/or the fluidic pressure of the compression chamber to oscillate. The amplitude of oscillations of fluidic pressure in the extension chamber and the amplitude of oscillations of fluidic pressure in the compression chamber may be determined using the first pressure sensor and second pressure sensor, respectively. The ratio of these amplitudes determines the relative pressure factor. In order to determine a frequency dependence of the relative pressure factor, the test may be repeated using an oscillating linear displacement of a different frequency, or a range of frequencies, and the same amplitude.

For the above described methodologies, the input (that is, the torque applied to the pump or the position of the piston) may be oscillated according to a regular wave (e.g., a pure sinusoidal wave), or the input may be oscillated according to any other regular or irregular waveform. For example, the oscillating input may oscillate according to a sinusoidal wave superimposed on a constant offset, or a sinusoidal wave superimposed on an offset that increases linearly with time. In the case of an oscillating input that oscillates according to an irregular waveform, it is recognized that the "frequency" of such input, as used herein, may refer to the peak frequency, and the "amplitude" of such input, as used herein, may refer to the root mean square (RMS) amplitude.

The cutoff frequency of the restriction element 61 may be adjusted based on, for example, the specific requirements of a given application. For an active suspension system of a road vehicle, this cutoff frequency may be selected to be, for example, between 3 and 10 Hz. Other cut-off frequencies both above and below this range may also be selected as the disclosure is not so limited.

In some embodiments, below the cut-off frequency, the extension-side of the actuator may have a first compliance that leads to first motion ratio of the actuator. Above this cutoff frequency, the extension-side of the actuator may have a second compliance that is less than the first compliance; correspondingly, for oscillations above the cutoff frequency, the actuator may have a second motion ratio that is less than the first motion ratio. Such design may allow for maximizing force capability in order to oppose motion at typical vehicle heave, pitch, and roll frequencies, while mitigating the transmission of impacts into the vehicle body 60 above these frequencies. Typically, motion of the vehicle body in heave, pitch and/or roll (e.g. primary ride) occurs at frequencies that are lower than road induced secondary ride frequencies.

Table II describes an exemplary implementation of the embodiment shown in FIG. 6, but other configurations or arrangements of this embodiment may be configured, and the disclosure is not so limited.

TABLE II

| | |
|---|---|
| Piston rod diameter | 18 mm |
| Piston Diameter | 46 mm |
| Compression chamber accumulator gas volume | 125 cc |
| Extension chamber accumulator gas volume | 160 cc |
| System static charge pressure | 35 bar |

TABLE II-continued

| Pump Displacement | 3.19e−7 m^3/rad |
| Pump rotational inertia | 2.3e−5 kg*m^2 |

Table III below describes exemplary performance of an embodiment of FIG. 4 that is sized according to Table II. The hydraulic stiffness of the compression and extension chambers during operation may be at least partly a function of the pressure change in each chamber as a result of fluid flow through the pump. In this embodiment, the accumulators may be charged with a pressurized gas but in other embodiments the accumulators include springs (e.g., linear springs, non-linear springs). The non-linear stiffness associated with the compression and expansion of gas in accumulators plays a roll in determining the difference between forces produced in the positive direction and those that are produced in the negative direction.

hydraulic system and the inertia of the rotating mass of the hydraulic pump. Curve 93 illustrates that, at low frequencies, the embodiment in FIG. 4 produces approximately 20% more force for the same torque input to the same hydraulic motor. The motion ratio transfer function exhibits a reduction at approximately 2-5 Hz which is a result of the change in the relative compliance factor as frequency increases in a system described by FIG. 4. It is also noted that since the compliance of the extension volume is being reduced by flow restriction, the resonance peak of the pump mass on the system compliance is reduced. In this illustration, the pump mass resonance occurs at approximately 15 hz.

Figure 9:
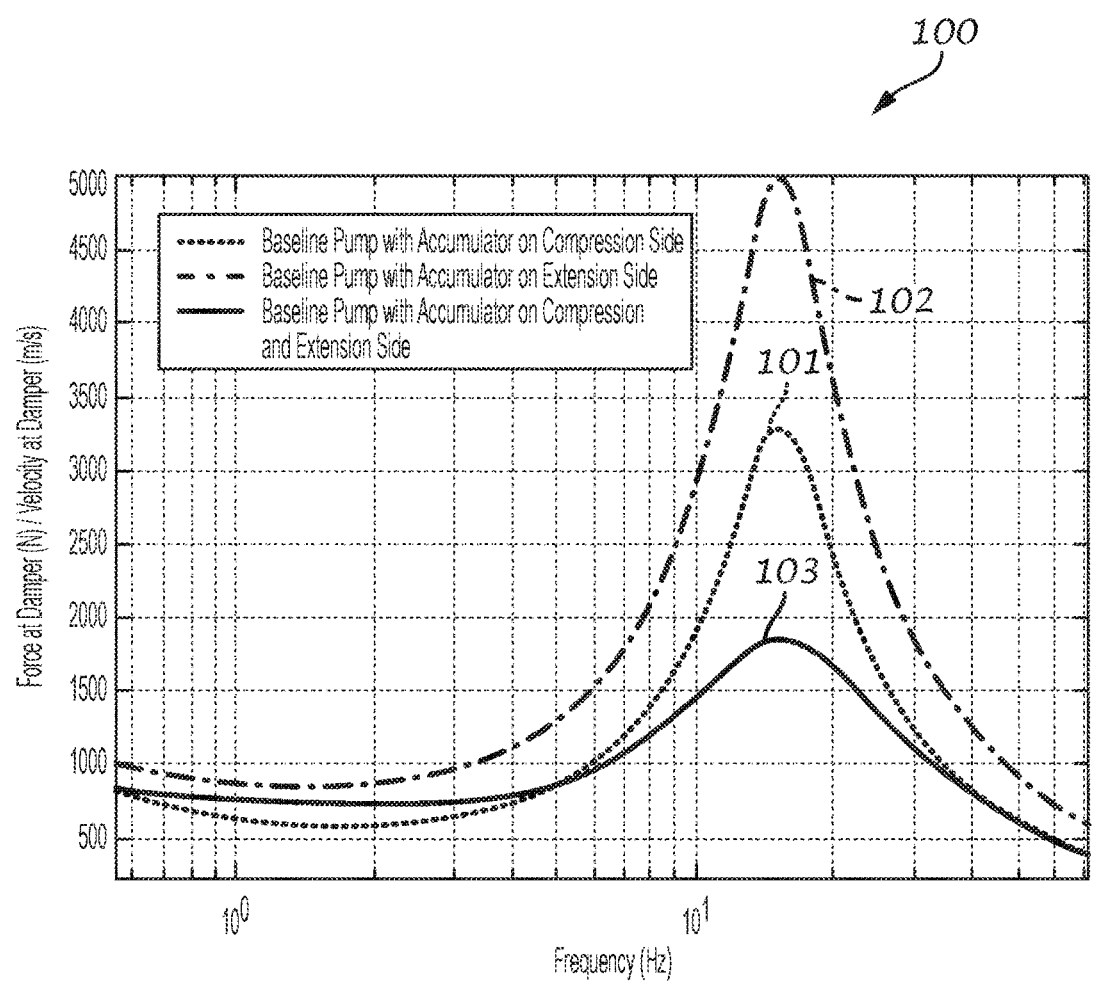
FIG. 9 demonstrates a plot of damping rate as a function of input frequency

FIG. 9 illustrates a frequency-response plot that depicts the relationship between velocity inputs at the wheel and the forces transmitted to the body of the vehicle for three embodiments. Curve 101 represents the response of the embodiment shown in FIG. 1. At about 15 Hz, there is a large impedance due to the rotating mass of the pump

TABLE III

| | Low Frequency System Performance (below cutoff frequency of 3 Hz) | | | High Frequency System Performance (above cutoff frequency of 3 Hz) | | | Improvement | |
|---|---|---|---|---|---|---|---|---|
| Pump Delta Pressure [bar] | Motion Ratio [rad/m] | Force Output [N] | Reflected pump mass [kg] | Motion Ratio [rad/m] | Force Output [N] | Reflected pump mass [kg] | Force Reduction above cutoff frequency (%) | Reflected mass reduction above cutoff frequency (%) |
| −20 | 3447 | −2340 | 272 | 3142 | −2100 | 226 | 10.3% | 17.0% |
| 0 | 3600 | 0 | 302 | 3142 | 0 | 226 | — | — |
| 20 | 3806 | 2550 | 332 | 3142 | 2100 | 226 | 17.7% | 32.0% |

Figure 7:
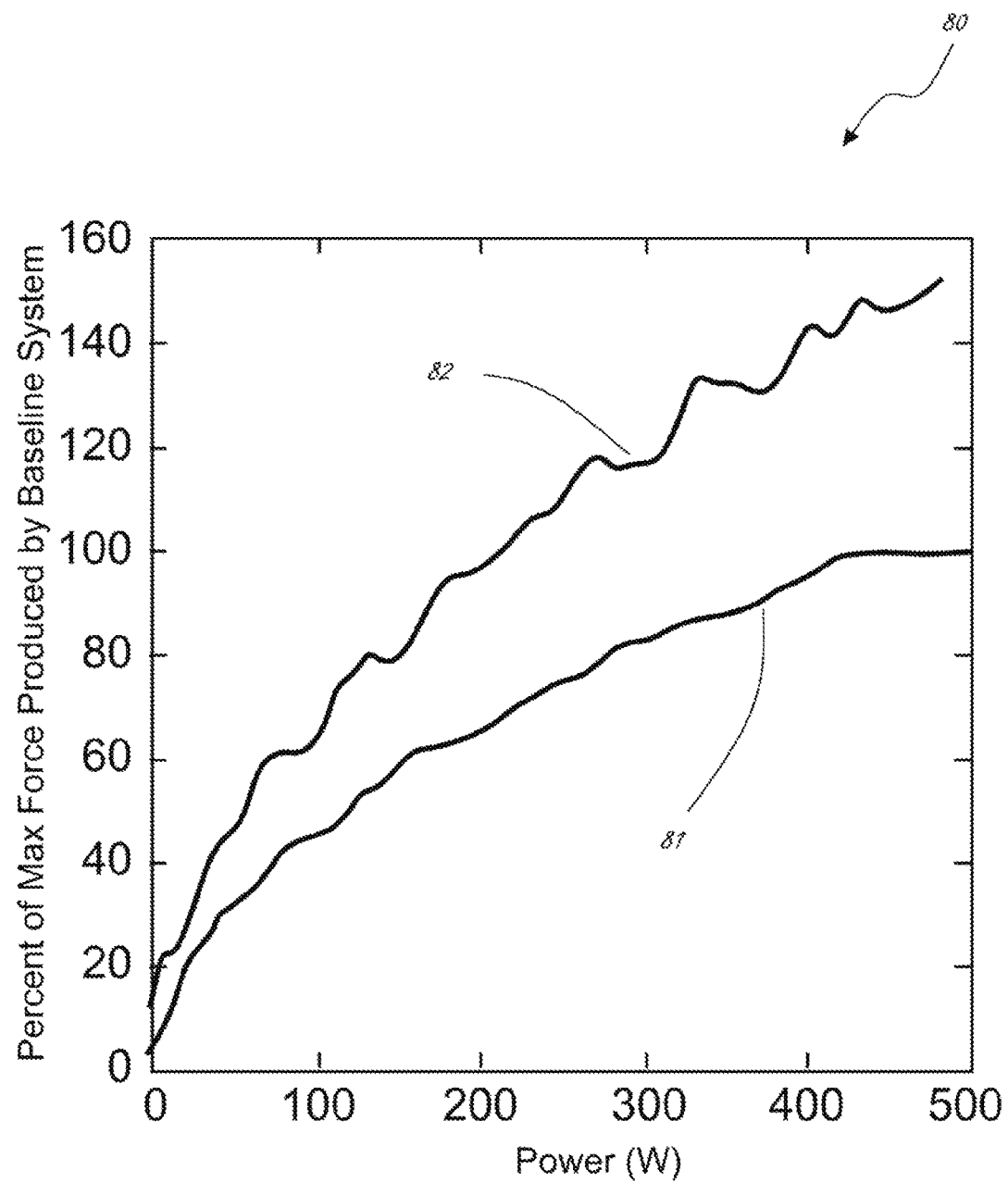
FIG. 7 demonstrates increase in the force produced by an embodiment of the hydraulic actuator illustrated in FIG. 4.

FIG. 7 illustrates a graph 80 that compares the improved performance that may be achieved at the damper by using the embodiment of FIG. 4. Curve 81 is a plot of the force that may be generated by using the embodiment of FIG. 1. In this embodiment, only a compression-side accumulator 30 is present, and the actuator does not contain an extension-side accumulator. The compliance of the compression-side of the actuator is therefore much larger than the compliance of the extension-side of the actuator (Ccom>>Cext). The curve 81 represents the force that is produced by the actuator (on the y-axis) illustrated in FIG. 1 as a function of power input to the hydraulic pump (on the x-axis). The curve 82 represents the force produced by the actuator shown in FIG. 4 versus the power input. In this comparison, pump 31 and pump 63 are the same pump (e.g., same mechanical efficiency, same displacement, etc.). This illustration is shown for steady state forces generated for low frequency motion. As can be seen, addition of the extension-side accumulator leads to a higher force capability, as discussed previously.

Figure 8:
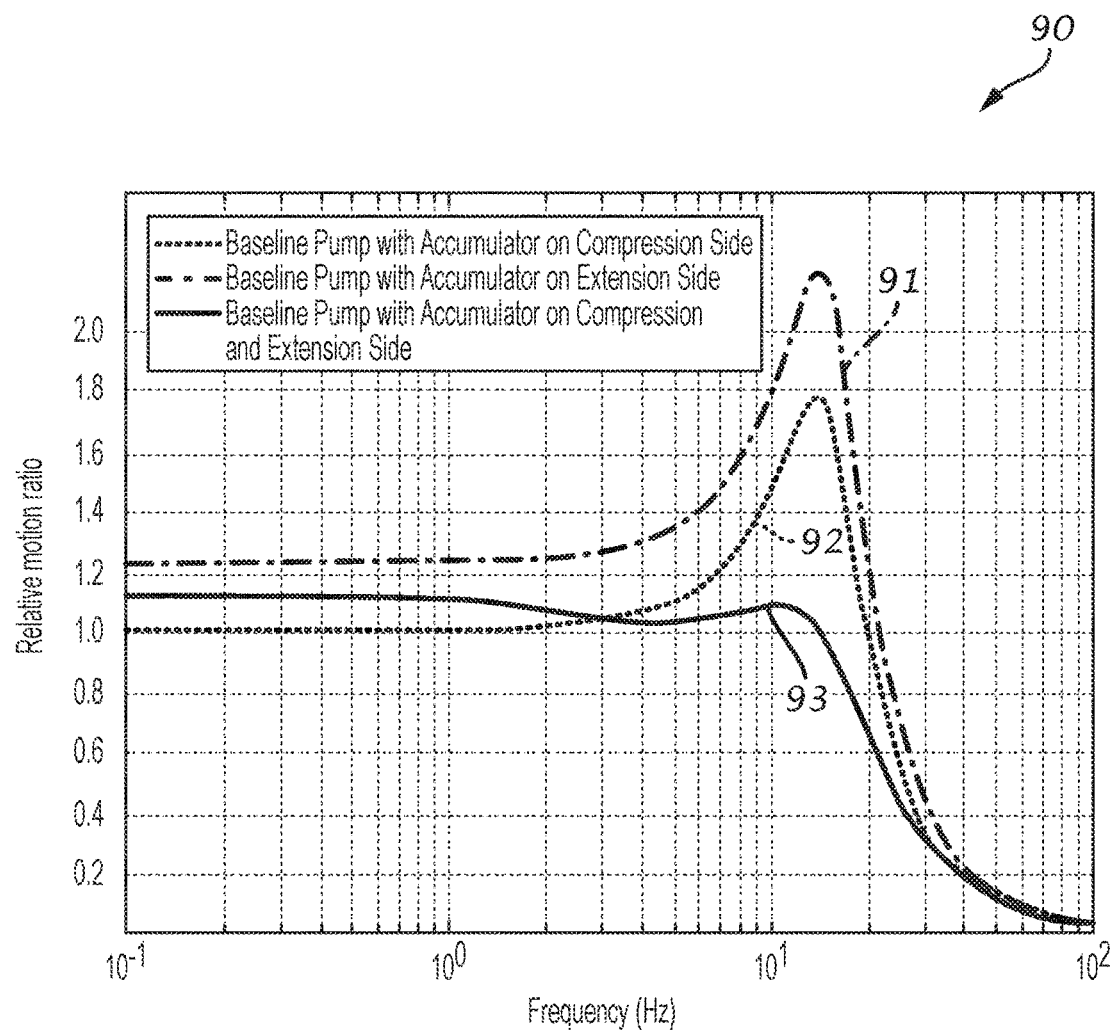
FIG. 8 demonstrates a plot of relative motion ratio as a function of input frequency.

In some embodiments, the behavior of motion ratio as a function frequency may be determined by other factors in addition to relative compliance ratio, such as, for example various system resonances. FIG. 8 illustrates the relative motion ratios the embodiments of FIG. 1. (curve 92), FIG. 2 (curve 91), and FIG. 4 (curve 93). Here, the mass resonance of the system is shown contributing to the relative motion ratio. The motion ratio peak shown here at approximately 15 hz, is not caused by the change in relative compliance factor, but by an undamped resonance of the pump mass on the accumulator spring elements in the hydraulic system. This acts similar to a mass spring system (wherein the pump serves as the mass and the hydraulic compliance serves as the spring). The resonance frequency may be determined by the stiffness or compliance of the oscillating on the stiffness of the fluid column. The curve 102 shows the response of the embodiment of FIG. 2. Since the embodiment described by FIG. 2 has a higher motion ratio, there is a higher system impedance at all frequencies and a much larger impedance at the resonance point of about 15 Hz. The curve 103 shows the response of the embodiment of FIG. 4. The system impedance is slightly higher at frequencies below approximately 5 Hz, but the system resonance is greatly reduced at the system resonance point. By using the embodiment of FIG. 4, pump elements with higher inertia may be used while maintaining a lower level of impedance within a predetermined range of frequencies.

Further, for the embodiment of FIG. 4 the delta pressure produced by the pump may be split across both the extension volume and the compression volume. This approach may be used to reduce the peak pressures in the system while exerting similar output forces. This may result in less mechanical stress and longer lasting hydraulic sealing elements.

In certain embodiments, compliance in a given hydraulic actuator may be provided by one or more discrete or distributed compliance elements such as, for example, gas-charged accumulators. In certain embodiments, instead of or in addition to a gas-charged accumulator, compliance may be provided by one or more spring loaded pistons, one or more elastic hoses, and/or one or more deformable housings. In the case of a spring loaded piston, the compliance element may be an accumulator with a spring loaded piston where the compliance, or a portion thereof, may be dynamically adjusted by using, for example, a pin that selectively locks the piston in place (thereby at least partially negating the compliance of the spring). Further, in certain embodiments, compliance may be provided primarily via compression and expansion of gas dissolved in the hydraulic fluid.

Figure 10:
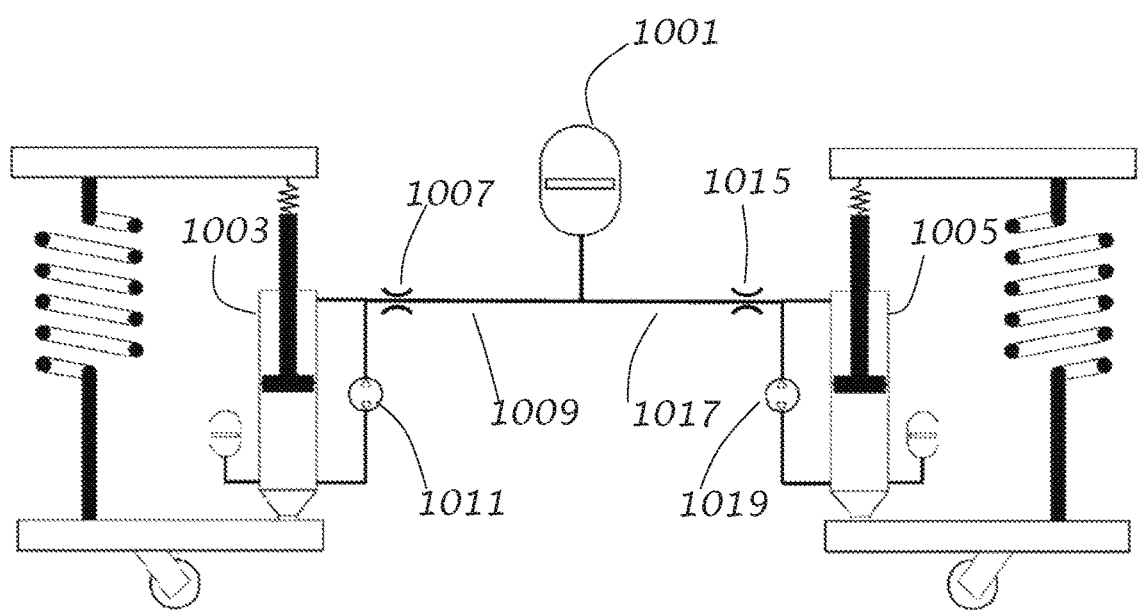
FIG. 10 illustrates an embodiment with multiple hydraulic actuators with a shared extension chamber compliance element.

In some embodiments, as illustrated by the exemplary embodiment in FIG. 10, a suspension system may include a single extension-side accumulator 1001 that is fluidically connected to the extension chambers of two different actuators within a suspension system. In these embodiments, the suspension system may further include a first restriction element 1007 disposed along a first flow path 1009 that connects the pump 1011 of a first actuator 1003 to the extension-side accumulator 1001. Additionally or alternatively, a second restriction element 1015 may be disposed along a second flow path 1017 that connects the pump 1019 of a second actuator 1005 to the extension-side accumulator 1001. The first restriction element 1007 may be configured to vary an inertance or impedance of the first flow path 1009 or a portion thereof, and/or the second restriction element 1015 may be configured to vary an inertance or impedance of the second flow path 1017 or a portion thereof. In the illustrated embodiment the extension-side compliance of the first actuator 1003 and the extension-side compliance of the second actuator 1005 may be independently controlled while requiring only a single, common extension-side accumulator 1001. Utilizing a single, common extension-side accumulator may reduce packaging requirements. Further, systems utilizing an extension-side accumulator that is common between multiple actuators, may have additional force capability as contributed by the rod area and delta pressure.

In some embodiments, a vehicle may comprise a first pair of coupled actuators, such as the first actuator and second actuator illustrated in FIG. 10, and a second pair of coupled actuators. In certain embodiments, the first pair may be located on the left side of the vehicle (in which case the first actuator of the first pair may correspond to the left front tire, and the second actuator of the first pair may correspond to the left rear tire) and the second pair may be located on the right side of the vehicle (in which case the first actuator of the second pair may correspond to the right front tire, and the second actuator of the second pair may correspond to the right rear tire). Alternatively, the first pair may be located in the front of the vehicle and the second pair may be located in the back of a vehicle. Alternatively, the first and second actuators of the first pair may be located in diagonally opposite corners of the vehicle, and/or the first and second actuators of the second pair may be located in diagonally opposite corners of the vehicle.

What is claimed is:

1. A hydraulic actuator comprising:
    a hydraulic cylinder that includes an extension chamber and a compression chamber;
    a hydraulic pump, with a first port and a second port, capable of generating a pressure differential between the compression chamber and the extension chamber;
    a hydraulic circuit including an extension-side and a compression-side, wherein the extension-side of the circuit includes the extension chamber and a first fluid flow path fluidically connecting the first port to the extension chamber, and wherein the compression-side of the circuit includes the compression chamber and a second fluid flow path fluidically connecting the second port to the compression chamber;
    wherein the hydraulic actuator exhibits a first relative compliance factor when exposed to a first oscillating input, and a second relative compliance factor when exposed to a second oscillating input, wherein:
    the frequency of the first oscillating input is less than the frequency of the second oscillating input, and
    the first relative compliance factor is greater than the second relative compliance factor.

2. The hydraulic actuator of claim 1, wherein the extension-side of the circuit has a first compliance that is at least partially determined by a first compliance element and the compression-side of the circuit has a second compliance that is at least partially determined by second compliance element.

3. The hydraulic actuator of claim 2, wherein the first compliance element is one of a gas charged accumulator in fluid communication with the first fluid flow path via an intervening restriction element, an accumulator with a spring loaded piston in fluid communication with the first fluid flow path via an intervening restriction element, and a hydraulic hose with a flexible wall segment that forms at least a portion of the first fluid flow path; and wherein the second compliance element is one of a gas charged accumulator in fluid communication with the second fluid flow path, an accumulator with a spring loaded piston in fluid communication with the second fluid flow, and a hydraulic hose with a flexible wall segment that forms at least a portion of the first fluid flow path.

4. A hydraulic actuator comprising:
    a hydraulic cylinder that includes an extension chamber and a compression chamber;
    a hydraulic pump, with a first port and a second port, capable of generating a pressure differential between the compression chamber the extension chamber;
    a first compliance element;
    a second compliance element;
    a first fluid flow path fluidically connecting the first port to the first compliance element;
    a second fluid flow path fluidically connecting the first port to the extension chamber;
    a third fluid flow path fluidically connecting the second port to the second compliance element;
    a fourth fluid flow path fluidically connecting the second port to the compression chamber;
    wherein the hydraulic actuator exhibits a first relative compliance factor when exposed to a first oscillating input, and a second relative compliance factor when exposed to a second oscillating input, wherein:
    the frequency of the first oscillating input is less than the frequency of the second oscillating input, and
    the first relative compliance factor is greater than the second relative compliance factor.

5. The hydraulic actuator of claim 4, wherein the first compliance element is one of a gas charged accumulator and an accumulator with a spring-loaded piston, wherein the second compliance element is one of a gas charged accumulator, and an accumulator with a spring loaded piston; and wherein the first flow path includes an intervening restriction element.

6. The hydraulic actuator of claim 5, wherein at least a portion of the first flow path and a portion of the second flow path are the same flow path and at least a portion of the third flow path and the fourth flow path are the same flow path.

7. The hydraulic actuator of claim 5, wherein the frequency of the first oscillating input is between 0-3 Hz and the frequency of the second oscillating input is between 8-20 Hz.

8. The hydraulic actuator of claim 5, wherein the intervening restriction element is at least one of poppet valve, shim stack, electrically controlled valve, pneumatically controlled valve and an orifice.

9. The hydraulic actuator of claim 5, wherein the hydraulic cylinder further includes:
    a housing at least partially enclosing an internal volume containing a quantity of hydraulic fluid;

a piston slidably received in the housing, thereby dividing the internal volume into a compression chamber and an extension chamber;
a piston rod attached to the piston.

10. The hydraulic actuator of claim 4, wherein the intervening restriction element is configured to vary an impedance of the first flow path based at least in part on a frequency of an input.

11. The hydraulic actuator of claim 4, wherein the intervening restriction element is an active valve and wherein the hydraulic actuator further includes a controller configured to actuate the active valve based at least in part on a frequency of an input.

12. A hydraulic actuator comprising:
a hydraulic cylinder that includes an extension chamber and a compression chamber;
a hydraulic pump, with a first port and a second port, arranged to generate a pressure differential between the compression chamber the extension chamber;
a first gas charged accumulator;
a second gas charged accumulator;
a first fluid flow path fluidically connecting the first port to the first gas charged accumulator;
a second fluid flow path fluidically connecting the first port to the extension chamber;
a third fluid flow path fluidically connecting the second port to the second gas charged accumulator;
a fourth fluid low path fluidically connecting the second port to the compression chamber;
wherein the hydraulic actuator exhibits a first relative pressure factor in response to a first oscillating input, and a second relative pressure factor in response to a second oscillating input, and wherein:
the frequency of the first oscillating input is below the frequency of the second oscillating input; and
the first relative pressure factor is less than the second relative pressure factor.

13. The hydraulic actuator of claim 12, wherein at least a portion of the first flow path and a portion of the second flow path are the same flow path and at least a portion of the third flow path and the fourth flow path are the same flow path.

14. The hydraulic actuator of claim 12, wherein the frequency of the first oscillating input is between 0-3 Hz and the frequency of the second oscillating input is between 5-10 Hz.

15. The hydraulic actuator of claim 12, further comprising a restriction element arranged along the second flow path.

16. The hydraulic actuator of claim 15, wherein the restriction element is configured to vary an impedance or inertance of the second flow path, or a portion thereof, based at least in part on a frequency of an input.

17. The hydraulic actuator of claim 16, wherein the restriction element is a shim stack.

18. The hydraulic actuator of claim 15, wherein the restriction element is an actively controlled valve and wherein the hydraulic actuator further includes a controller configured to actuate the valve based at least in part on a frequency of an input.

19. The hydraulic actuator of claim 12, wherein the hydraulic cylinder further includes:
a housing at least partially enclosing an internal volume containing a quantity of hydraulic fluid;
a piston slidably received in the housing, thereby dividing the internal volume into a compression chamber and an extension chamber;
a piston rod attached to the piston.

20. A method of operating a hydraulic actuator having a hydraulic cylinder with a piston slidably received in the hydraulic cylinder and dividing the hydraulic cylinder into an extension chamber and a compression chamber, the method comprising:
applying a first oscillating input to the actuator, wherein the first oscillating input generates a first pressure wave in the extension chamber and a second pressure wave in the compression chamber, wherein a ratio of an amplitude of the first pressure wave to an amplitude of the second pressure wave is a first relative pressure factor; and
applying a second oscillating input to the actuator, wherein the second oscillating input generates a third pressure wave in the extension chamber and a fourth pressure wave in the compression chamber, wherein a ratio of an amplitude of the third pressure wave to an amplitude of the fourth pressure wave is a second relative pressure factor;
wherein a frequency of the second oscillating input is greater than a frequency of the first oscillating input; and wherein the second relative pressure factor is greater than the first relative pressure factor.

21. The method of claim 20, wherein the actuator includes a pump arranged to generate a pressure differential between the extension chamber and compression chamber, and wherein the first oscillating input is a first oscillating torque applied to the pump.

22. The method of claim 21, wherein the second oscillating input is a second oscillating torque applied to the pump.

23. The method of claim 22, wherein the frequency of the first oscillating input and the frequency of the second oscillating input are in the range of 2 to 12 Hz.

* * * * *